April 8, 1930.  D. R. LASIER  1,753,214

DOORCHECK

Filed June 9, 1928

Inventor:
David R. Lasier,
By Wilkinson, Hurley, Byron & Knight
Attys.

Patented Apr. 8, 1930

1,753,214

UNITED STATES PATENT OFFICE

DAVID R. LASIER, OF CHICAGO, ILLINOIS, ASSIGNOR TO NORTON-LASIER COMPANY, OF CHICAGO, ILLINOIS, A CORPORATION OF ILLINOIS

DOORCHECK

Application filed June 9, 1928. Serial No. 284,158.

This invention relates to fluid checking devices, particularly to the type of fluid checking device employed for controlling a swinging action of doors, windows or similar means.

Checking devices of this general character usually embody in their construction a spring means connected for operation whereby the door will be forced closed as desired and a checking device operating in conjunction with the spring for offering a braking action on the spring actuated door movement.

The principal object of the present invention is to provide an improved fluid checking device which is highly efficient in operation, is durable, is cheaply and easily made and maintained.

A further object is to provide a door check which is free from leakage of the fluid from the fluid checking portion thereof.

The merits of the present invention will appear from the following disclosure of one embodiment thereof which is given merely by way of example, and the utility of the invention will appear from the advantages which are realized in the particular embodiment illustrated.

Figure 1:
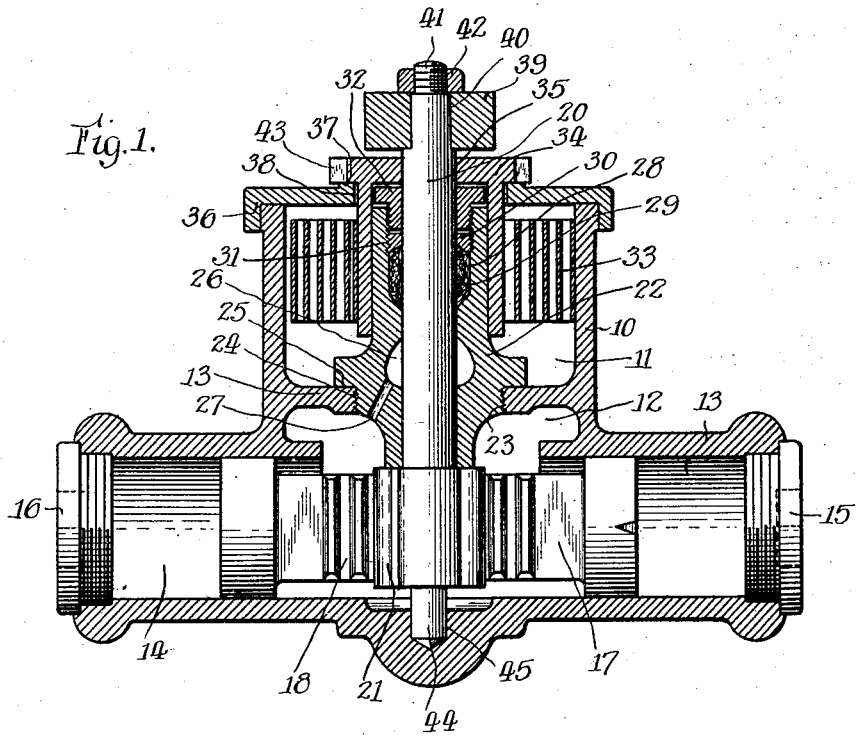
Figure 2:
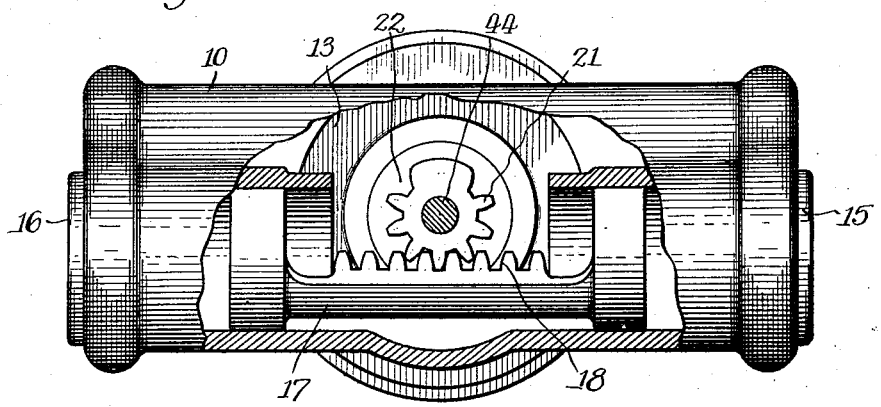

The following description will be more readily understood by referring to the accompanying drawings, in which Figure 1 is a side elevational view in cross section of a fluid checking device constructed in accordance with this invention, and Figure 2 is a bottom view of the device shown in Figure 1, a portion thereof being cut away to illustrate the internal construction.

The various novel features of the invention will appear as the description proceeds.

In order that the invention may be more readily understood, the advantages and utility of the particular embodiment disclosed are herein given.

Fluid checking devices of the type to which this invention appertains usually embody in their construction an operating spindle which is spring actuated to force a rotation thereof in one or both directions depending upon whether the control is double or single acting. The spindle is further controlled by a checking device which usually comprises a fluid dash pot and piston construction connected for operation to the spindle. This latter connection necessitates the introduction of the spindle into the fluid compartment of the check casing which in turn necessitates some adequate means for preventing the leakage of fluid through the bearing or opening where the spindle enters the chamber.

In heavy usage it is found that the bearing which supports the spindle is subjected to unusually heavy wear and without the exercise of special precaution a leaky check will result.

The applicant has discovered that there are two factors which influence this condition in fluid checks which have been taken into consideration and enabled the applicant to devise a check free from the danger of leakage.

The first factor is that a bearing must be provided for the spindle which offers ample support and is accurately aligned and fitted as regards its contact with the spindle, and the second factor is that the construction of the bearing and other parts of the check must be such that the bearing will be capable of resisting wear, permitting the maintenance of the accurately aligned and fitted bearing in usage. The applicant has further discovered that there are two factors which influence the second of the above factors, namely, the maintenance or destruction of the accurately aligned and fitted bearing. The first of these is that of constructing the bearing with relatively large bearing surfaces contacting in bearing relation with the spindle at relatively spaced points throughout its length. The increased bearing area, of course, makes for wear, whereas the spaced bearing contact tends to maintain an alignment of the spindle. The second of these latter factors which tend to influence the maintenance of shaft alignment is that of the operating torque on the spindle in operation. Explaining further it will be appreciated that if twisting or straining loads are continually placed upon the spindle the bearing will tend to wear in a single spot or local area more quickly than if the checking load is applied to the spindle in a gradual uniform manner.

After analyzing these conditions carefully, the applicant has concluded that a bearing should be provided which contacts the spindle throughout the relatively large area and at spaced points of the spindle, which bearing is made as a unit to assure absolute accuracy of alignment, and, further, that the bearing and spindle, together with its packing, be mounted in the checking casing so that it is entirely independent thereof as regards the support and operation of the spindle. Further, a type of connection should be provided between the spindle and the fluid checking device which will effect a uniform and gradually controlled movement of the spindle while permitting, if necessary, a slight clearance or freedom between the operating piston and the spindle. In other words, the present invention provides a spindle and bearing which is completely aligned and fitted with a packing, wholly independent in structure of the checking casing and is mounted as a unit in the casing and free from bearing contact therewith. The spindle is connected to the fluid checking means through the instrumentality of mechanism which will accommodate any misalignment which might occur between these parts rather than to force under conditions of misalignment wear or detrimental strains between the bearing and spindle.

By referring to the drawings, it will be noted that the present disclosure relates to a checking device having a casing 10 divided into an upper compartment 11 and a lower fluid compartment 12 by means of the partition 13. The lower compartment 12 is preferably machined to form two opposed cylinders 14, the ends of which are closed by the plugs 15 and 16. Mounted to slide in the cylinder is the double headed piston 17 provided with the intermediate rack 18. The spindle 20 is provided with a pinion 21 at its lower end for meshing with the rack whereby a connection is provided between the fluid checking piston and the spindle. The rack and pinion is a type of connection which is uniform and gradual in its operation and is further one having a slight clearance between its parts for preventing the transmission of twisting strains or strains of misalignment on the spindle. It also permits the spindle to be slightly misaligned relative to the perpendicular axis of the checking device without interfering with the operation thereof. The bearing for the spindle comprises the element 22 having a threaded portion 23 mounted in the threaded opening 24 of the partition 13. It is further provided with a flange 25 having an accurately machined or otherwise made undersurface cooperating with a similar accurately made surface on the upper portion of the partition 13 surrounding the opening 24. This is to assure that the bearing element is aligned as accurately as possible to the perpendicular axis of the check when the bearing element is screwed to its maximum inward position. The recess 26 is provided in the bearing element 22 communicating with the chamber 12 by means of a duct 27. Its upper portion is provided with a recess 28 adapted to receive the packing 29 restrained by means of the packing gland 30. The packing gland is screw threaded as at 31 in the upper portion of the recess 28, which recess also receives the upper bearing nut or collar 32 also by screw threaded engagement. The bearing and spindle are fitted independently of and prior to their introduction into the casing. The bearing element 22 is first provided with the threaded recess 28 and fitted with the gland 31 and collar 32 fully screwed down to their final position after which the entire bearing, including the gland and collar, are machined in one operation. This assures accuracy of alignment and fit. The bearing and spindle are then introduced into the casing so that the pinion meshes with the rack and secured by screwing the bearing element down on the threads 24 until the flange surface 25 accurately engages the upper surface of the portion 13 and thereby positions the spindle in alignment.

The upper compartment 11 of the casing is for housing a spring 33 which is illustrated as a convolute type having its outer end attached to the casing and its inner end attached to the flanged or ratchet sleeve element 34. The sleeve has a bearing engagement on the outside of the bearing element 22 and on the spindle by means of the opening 35 which surrounds the upper end of the spindle. A cover 36 is provided for closing the spring compartment which has the portion 37 for preventing downward displacement of the flange sleeve, but is provided with an opening 38 of larger diameter than the sleeve and bearing. This is to assure clearance between these parts so that the casing will have no aligning influence on the bearing or spindle at this point.

The upper end of the spindle is connected with any suitable operated lever such as lever 39 connected to rotate the shaft by the squared off portions 40 and retained by the reduced end 41 and nut 42 screwed thereon. The operating lever 39 is preferably provided with a dog of some character, not shown, for engaging teeth 43 on the flanged ratchet sleeve for the purpose of connecting the spring for moving the door. The lower end of the spindle, it will be noted, is extended as at 44 and is mounted in a bearing socket 45, as shown in Figure 1. This bearing is relatively small and is made to be accurately aligned with the bearing element 22.

The recess 26 is for the purpose of providing air space to collect the fluid which works up the spindle and thereby increase the sealing action of the packing by operating in the nature of an oil seal. The oil is permitted to return through duct 27.

It will be obvious that the present disclosure relates to a door check free from the objections above enumerated and one in which a combination of bearing and packing is provided with a type of connection between the spindle and fluid device which will give new and unexpected desirable results.

The above disclosure is given merely as one embodiment of the present invention and is not to be considered as limiting the invention in any way. The scope of the invention will be determined by an understanding of the present disclosure as one embodiment thereof and will be particularly pointed out in the appended claim.

I claim:

In a closing and checking device of the type having an integrally formed casing constituting a fluid cylinder and a spring compartment, the combination of an apertured partition dividing said casing into said cylinder and spring compartment, and an apertured outside wall for substantially closing said spring compartment, disposed in opposed relation to said partition, a spindle and bearing assembly extending through said spring compartment with the one end of said spindle extending beyond said wall and the other end of said spindle extending beyond said partition and into said cylinder, said spindle and bearing assembly being mounted in the aperture of said partition and extending into the aperture of said wall but spaced from and out of supporting contact therewith, said spindle and bearing assembly having spaced bearing surfaces located adjacent said outside wall and adjacent said partition respectively and having sealing means located between said bearing surfaces.

Signed at Chicago, Illinois, this 7 day of June, 1928.

DAVID R. LASIER.